Feb. 26, 1924.
J. R. PADESKY
1,485,336
PRESSURE GAUGE
Filed July 30, 1923
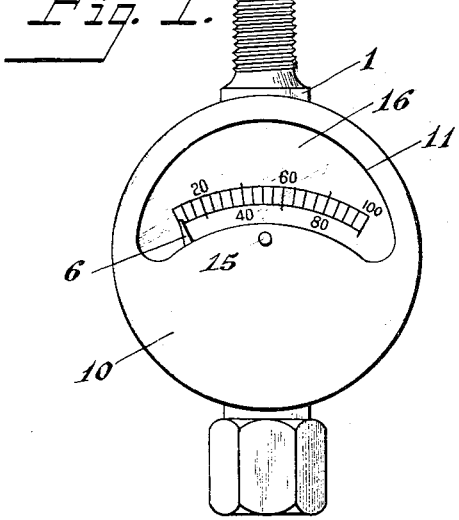
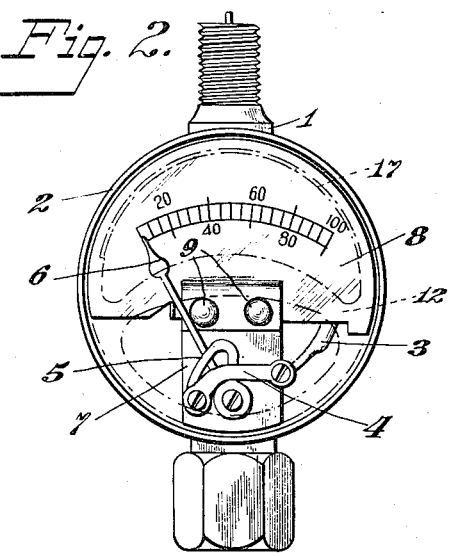
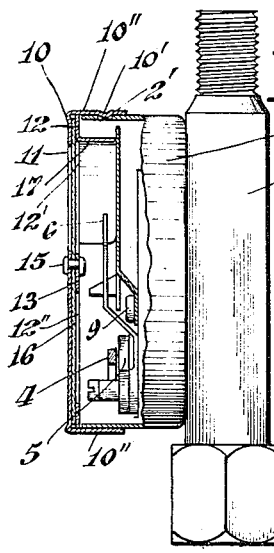
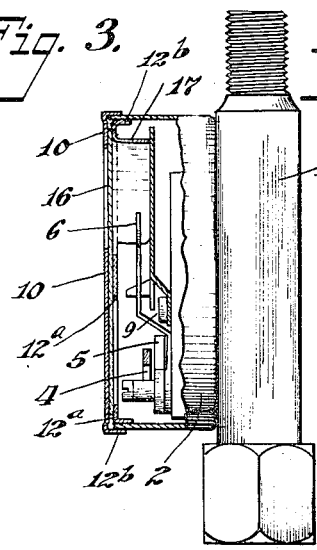
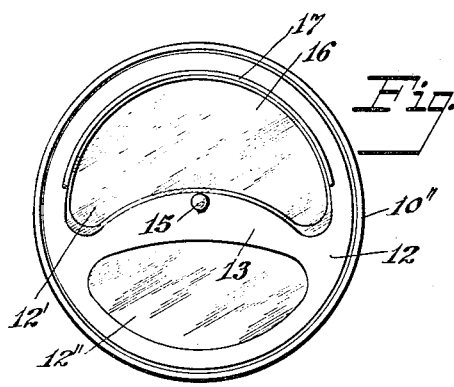
Inventor
John R. Padesky
By
Attorneys Patented Feb. 26, 1924.

1,485,336

UNITED STATES PATENT OFFICE.

JOHN R. PADESKY, OF LA CROSSE, WISCONSIN, ASSIGNOR TO NATIONAL GAUGE & EQUIPMENT COMPANY, OF LA CROSSE, WISCONSIN, A CORPORATION OF WISCONSIN.

PRESSURE GAUGE.

Application filed July 30, 1923. Serial No. 654,584.

*To all whom it may concern:*

Be it known that I, JOHN R. PADESKY, a citizen of the United States, residing at La Crosse, in the county of La Crosse and State of Wisconsin, have invented certain new and useful Improvements in Pressure Gauges, of which the following is a specification.

This invention relates to improvements in pressure gauges, the particular instrument shown in the drawing being a gauge for testing the pressure of pneumatic tires, although the invention is applicable to other forms of pressure gauges.

In gauges of this type there is employed a dial over which moves a pointer and difficulty has been experienced in making the dial lie parallel to the plane of the travel of the pointer, the dial having a tendency to raise up at one end or the other so that the pointer will strike the dial and a proper indication thereby prevented.

The object of this invention is to provide a dial spacer of simple construction so arranged as to bear upon the dial and prevent any movement of the dial from its normally-intended position, keeping the dial flat so that the pointer will be free to move thereover without any interference thereby.

A further object of the invention is to provide a dial support so constructed and arranged as to also serve as a supporting ring for the transparent covering for the dial.

Referring to the drawings:

Fig. 1 is a front elevation of a gauge embodying the improvements.

Fig. 2 is a front elevation of the gauge with the cap removed and showing the spacing ring in dotted lines.

Fig. 3 is a view partly in vertical section and partly in side elevation, the section being on the line 3—3 of Fig. 1.

Fig. 4 is a view partly in section and partly in side elevation showing a modification.

Fig. 5 is a rear elevation of the outer cap, transparent covering and the spacing ring employed in the construction shown in Fig. 3.

Fig. 6 is a perspective view of the rear face of said spacing ring.

Referring to the drawings, 1 represents a body portion to which the gauge is attached. In the present case this body portion is one applicable for attachment to the air valve tube of a pneumatic tire and has provision for the attachment of a hose connection from a suitable source of air supply. The gauge mechanism proper is of a well known type and is located in a casing 2 which is soldered or otherwise secured to the body 1. This mechanism in the present case employs a Bourdon tube 3 which has its free end pivotally connected by the link 4 to the curved arm 5, which arm has a connection with the pivoted pointer 6; these parts being all mounted upon a supporting member 7 located in and connected with the casing. A dial 8 over which the pointer moves is also connected with the support 7 by rivets 9, this dial being constructed of thin sheet metal in the usual way. The outer end of the casing is closed by a cap 10 which is slipped over the exterior surface of the casing and held in position by causing a small indentation 10' in the flange 10'' of the cap to spring into a small opening 2' in the casing. This outer cap is provided with an opening 11 to expose the indications on the dial and the upper end of the pointer.

The spacing ring is indicated at 12 and is provided with an integral bridge piece 13 having a small opening 14 to receive a rivet 15 by which it is secured to the cap 10, a transparent covering 16 being secured between the cap and ring by the same rivet; this covering being celluloid or any other suitable transparent material. The ring 12 has an integral semi-circular laterally-projecting flange 17 removed from the outer periphery of the ring a suitable distance and being of such width that when the parts are assembled the free edge thereof will rest against the dial 8 as clearly shown in Fig. 3.

In assembling the parts the cap, spacing ring and transparent covering are secured together by the rivet as described, with the transparent covering 7 between the ring and cap, after which the cap is inserted onto the casing and secured in the manner before described.

By this construction it will be seen that very simple and effective means are provided for spacing the dial plate, thereby preventing it from springing or otherwise moving into the path of the pointer and also for securing in position the transparent covering for the dial. The spacing ring 12 being provided with a cross-piece or bridge of sufficient strength only to support the transparent covering, not only has an opening 12′ to expose the dial, but also an opening 12″ to provide ample clearance for the pointer operating members, which is important in a dial gauge of this particular type, as the gauge casing must necessarily be of a shallow character and the mechanism compactly arranged therein.

In Fig. 4 there is shown a slight modification in which the spacing ring indicated at 12ª instead of being riveted to the cap, is provided with a peripheral flange 12ᵇ which is pressed into the casing 2, the transparent covering in this case being clamped between the cap and ring.

Having thus described my invention, I claim:

1. In a gauge, a casing open at one end, a dial plate supported in said casing, a pointer in said casing movable over said dial, devices in said casing for operating said pointer, a cap fitted to the open end of said casing, and a spacing member between said cap and dial having a part bearing on said dial to hold the same in spaced relation with said pointer, said cap and spacing member having openings to expose the indications on said dial and said spacing member also having an opening therein to provide clearance space for said pointer operating devices.

2. In a gauge, a casing open at one end, a dial plate supported in said casing, a cap fitted to the open end of said casing, a spacing member having a semi-circular flange capable of bearing on the outer portion of said dial, a transparent covering fitting within said cap and located between the top of the cap and said spacing member, said spacing member having an extended bearing surface, in addition to the flange bearing engaging the portion of the said transparent covering near the periphery thereof, whereby the same will be clamped between the top of the cap and the spacing member.

In testimony whereof, I have hereunto set my hand this 17th day of July, 1923.

JOHN R. PADESKY.